(12) United States Patent
Howe et al.

(10) Patent No.: US 11,752,462 B2
(45) Date of Patent: Sep. 12, 2023

(54) EFFLUENT PROCESSING APPARATUS AND METHOD FOR A VEHICLE AIR BRAKE CHARGING SYSTEM

(71) Applicant: Bendix Commercial Vehicle Systems LLC, Elyria, OH (US)

(72) Inventors: Stephen Howe, Cuyahoga Falls, OH (US); David W. Perry, North Ridgeville, OH (US); Gregory R. Ashley, Amherst, OH (US); Fred W. Hoffman, Wakeman, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 58 days.

(21) Appl. No.: 17/335,323

(22) Filed: Jun. 1, 2021

(65) Prior Publication Data

US 2021/0283543 A1 Sep. 16, 2021

Related U.S. Application Data

(63) Continuation of application No. 16/214,647, filed on Dec. 10, 2018, now abandoned.

(51) Int. Cl.
*B01D 46/00* (2022.01)
*B60T 13/68* (2006.01)
*B60T 17/00* (2006.01)
*B60T 17/02* (2006.01)

(52) U.S. Cl.
CPC ........ *B01D 46/0031* (2013.01); *B60T 13/683* (2013.01); *B60T 17/004* (2013.01); *B60T 17/02* (2013.01)

(58) Field of Classification Search
CPC .. B01D 46/0031; B01D 46/083; B01D 46/00; B01D 46/08; B60T 13/683; B60T 17/004; B60T 17/02
USPC ....................... 95/273; 55/320, 331
See application file for complete search history.

(56) References Cited

U.S. PATENT DOCUMENTS

| | | | |
|---|---|---|---|
| 1,405,259 A * | 1/1922 | Beach | F04B 39/16 55/DIG. 24 |
| 3,997,303 A * | 12/1976 | Newton | B01D 46/00 55/463 |
| 4,516,994 A * | 5/1985 | Kocher | F25B 43/02 55/498 |
| 2017/0014745 A1* | 1/2017 | Zuerker | B01D 46/2411 |
| 2017/0144128 A1* | 5/2017 | Carrion | B01J 19/14 |

* cited by examiner

*Primary Examiner* — Robert A Hopkins
*Assistant Examiner* — Qianping He
(74) *Attorney, Agent, or Firm* — Cheryl L. Greenly; Brian E. Kondas

(57) ABSTRACT

An effluent processing apparatus comprises a housing having an inlet port and a chamber. A coalescing element is located in the chamber and arranged coaxially with the inlet port. The coalescing element has pleats in a predefined pattern of paths arranged to separate oil and water from an effluent mixture containing air, oil, and water. The effluent mixture flows into the inlet port along an axis of the coalescing element. The effluent mixture is deflected by a portion of the housing to flow perpendicular to the axis along major surfaces of the pleats to separate oil and water from the effluent mixture.

7 Claims, 12 Drawing Sheets

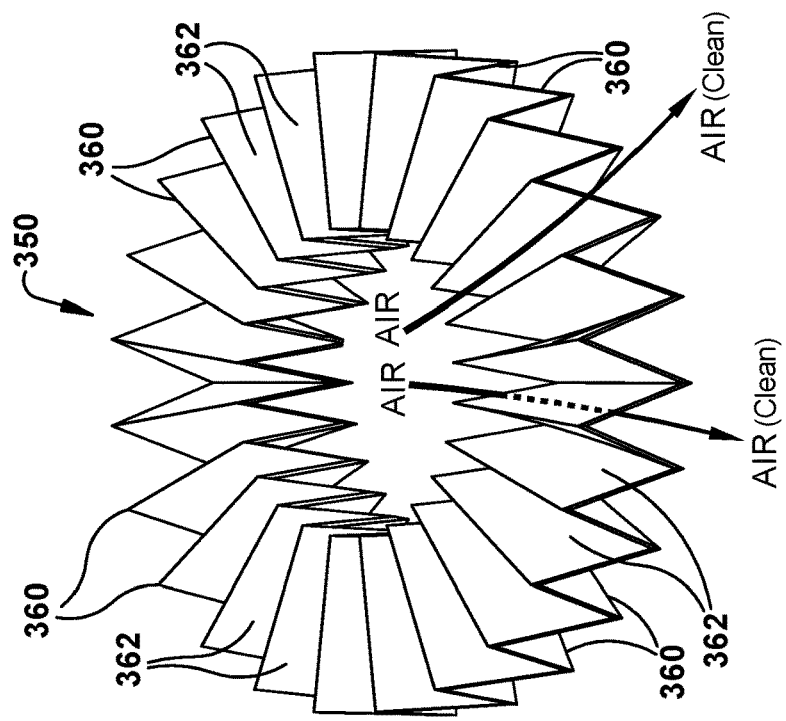
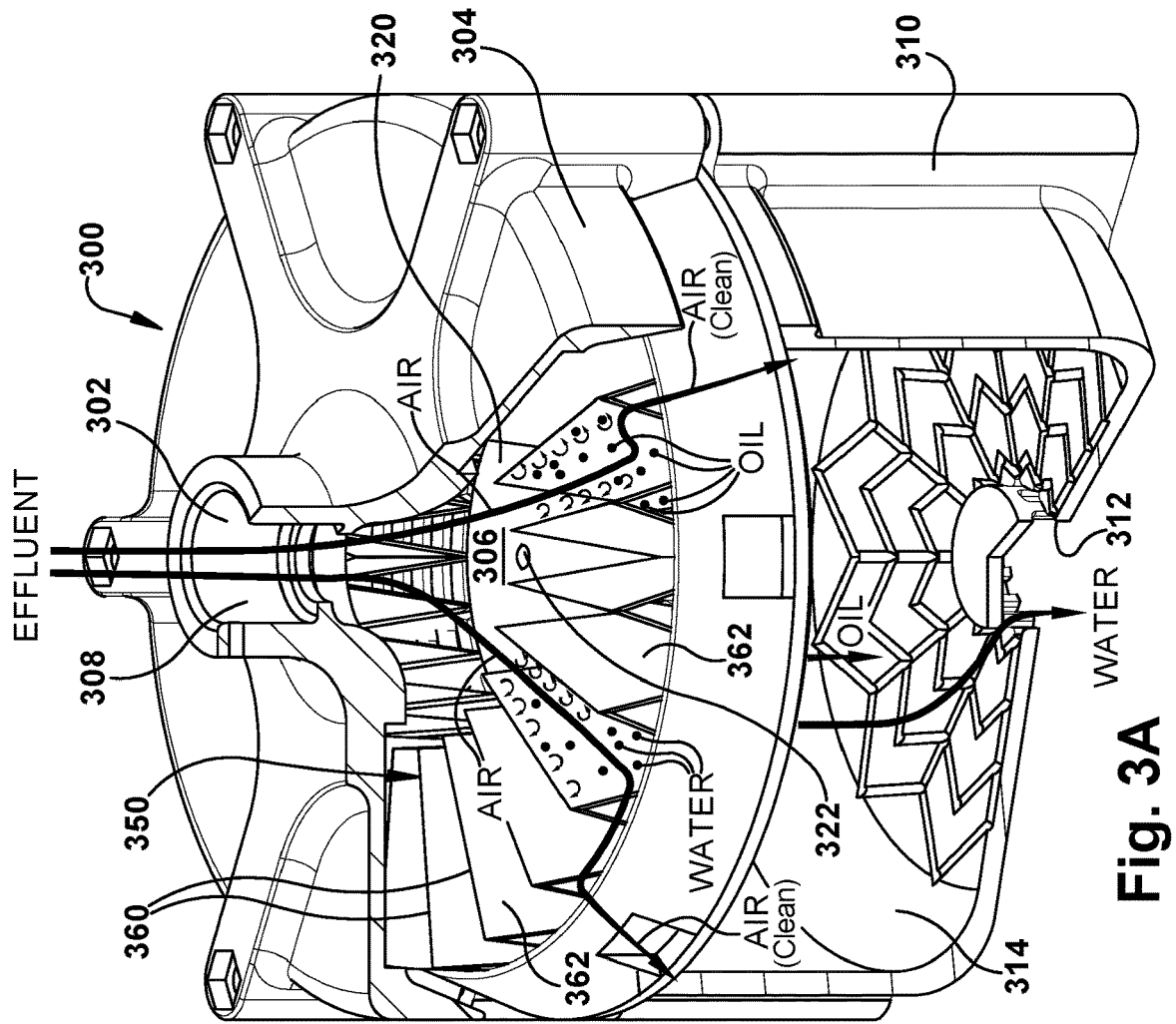

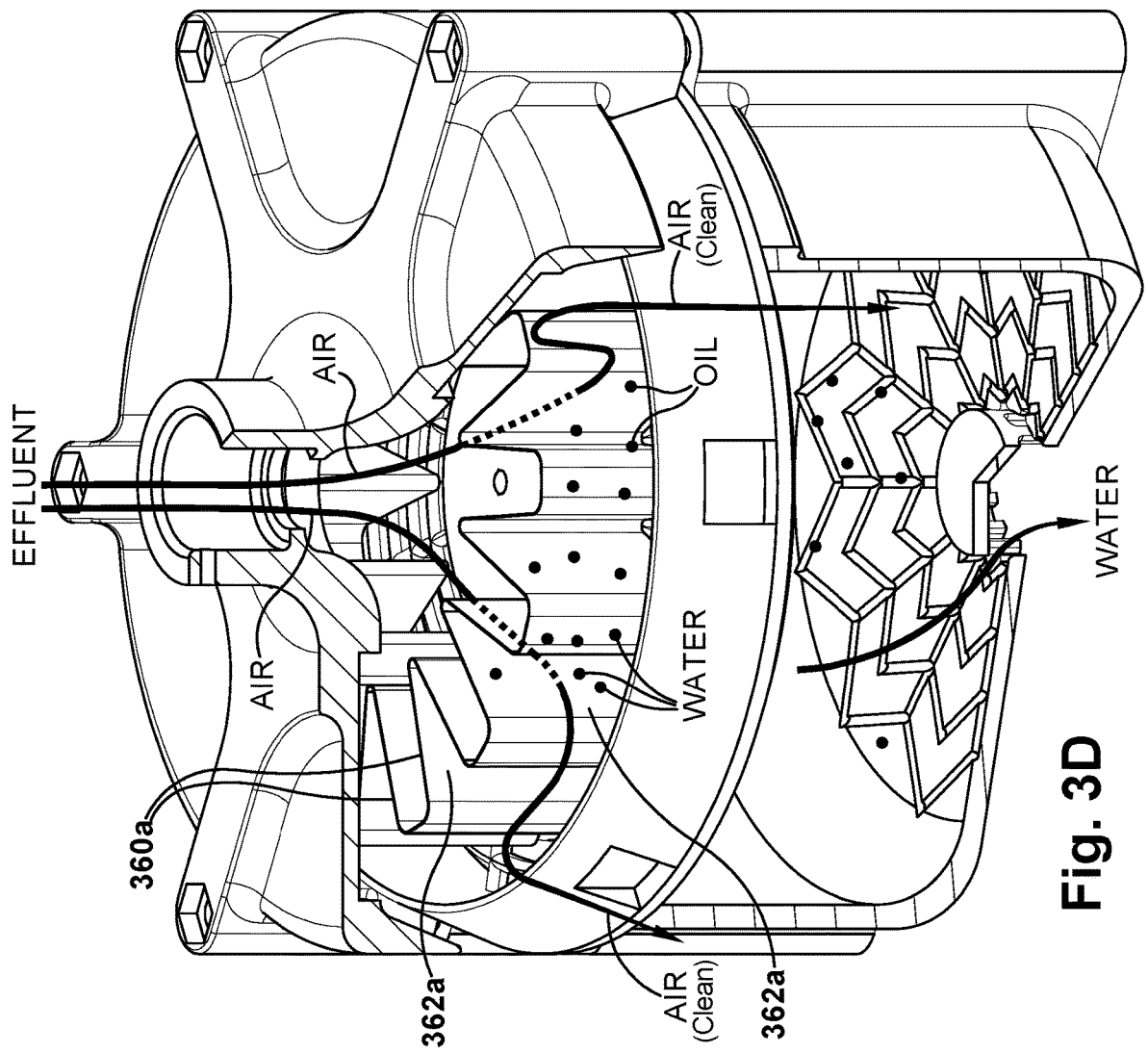

EFFLUENT PROCESSING APPARATUS AND METHOD FOR A VEHICLE AIR BRAKE CHARGING SYSTEM

CROSS REFERENCE TO RELATED APPLICATION

This application is a continuation of the pending U.S. patent application Ser. No. 16/214,647 entitled "Effluent Processing Apparatus and Method for a Vehicle Air Brake Charging System" filed Dec. 10, 2018, the entire disclosure of which is incorporated fully herein by reference.

BACKGROUND

The present application relates to vehicle air brake charging systems and is particularly directed to an effluent processing apparatus and method for a vehicle air brake charging system, such as a truck air brake charging system.

A truck air brake charging system includes a vehicle air compressor which builds air pressure for an air braking system. The compressor is typically lubricated by an engine oil supply. A governor controls system air pressure between a preset maximum and minimum pressure level by monitoring the air pressure in a supply reservoir. When the supply reservoir air pressure becomes greater than that of a preset "cut-out" setting of the governor, the governor controls the compressor to stop the compressor from building air and also causes an air dryer downstream from the compressor to go into a purge mode. As the supply reservoir air pressure drops to a preset "cut-in" setting of the governor, the governor returns the compressor back to building air and the air dryer to air drying mode.

The air dryer is an in-line filtration system that removes both water vapor and oil droplets from the compressor discharge air after it leaves the compressor. This results in cleaner, drier air being supplied to the air braking system, and aids in the prevention of air line and component freeze ups in winter weather. The air dryer typically uses a replaceable cartridge containing a desiccant material and an oil separator. Most of the oil droplets are removed by the oil separator as the air passes into the air dryer. The air then moves through the desiccant material which removes most of the water vapor.

When the air pressure in the supply reservoir reaches the preset cut-out setting of the governor, the governor makes the compressor stop building air and allows the air dryer's "purge cycle" to begin. During the purge cycle, the desiccant material is regenerated (i.e., its ability to remove water is renewed) by a reversal of the saturation process. A small amount of dry air passes back through the desiccant material and the water that has been collected, as well as any oil droplets collected by the oil separator, are purged out through a purge valve to atmosphere. Since the purged air from the purge valve contains oil droplets, this results in depositing of oil onto roadways by the truck. Accordingly, those skilled in the art continue with research and development efforts in cleaning the purged air from purge valves.

SUMMARY

In accordance with one embodiment, an effluent processing apparatus comprises a coalescing element arranged to separate oil and water from an effluent mixture containing air, oil, and water from a purge valve of an air dryer. The coalescing element includes a plurality of members which define a predefined pattern of paths along which the effluent mixture flows to separate oil and water therefrom.

In accordance with another embodiment, an effluent processing apparatus is provided for a vehicle air brake charging system having an air dryer purge valve through which an effluent containing a mixture of air, oil, and water flows in a flow direction. The effluent processing apparatus comprises a coalescing element arranged to separate oil and water from the effluent mixture to provide an air stream substantially devoid of oil. The coalescing element is oriented parallel with the flow direction of the effluent mixture such that the effluent mixture flows substantially around or substantially along the coalescing element.

In accordance with yet another embodiment, a method is provided of operating an effluent processing apparatus to separate oil and water from a flow of effluent mixture containing air, oil, and water. The method comprises receiving the flow of effluent mixture in a first direction into a center portion of the chamber and redirecting the flow of effluent mixture from the center portion of the chamber in a second direction which is transverse to the first direction and towards an outer perimeter portion of the chamber. The method also comprises passing the flow of effluent mixture along a predefined pattern of paths to separate oil and water from the effluent mixture as the effluent mixture flows from the center portion of the chamber to the outer perimeter portion of the chamber. The method further comprises temporarily retaining the separated oil to provide a clean stream of air and water devoid of oil that flows into the outer peripheral chamber and exhausting the clean stream from the outer perimeter portion of the chamber to atmosphere.

BRIEF DESCRIPTION OF THE DRAWINGS

FIG. 3A is a perspective view similar to FIG. 2B, and showing an effluent processing apparatus having a coalescing element constructed in accordance with another embodiment.

FIG. 3B is an enlarged top perspective view of the coalescing element shown in FIG. 3A.

FIG. 3D is a perspective view similar to FIG. 3A, and showing a variation of the coalescing element shown in FIG. 3A.

DETAILED DESCRIPTION

Figure 1:
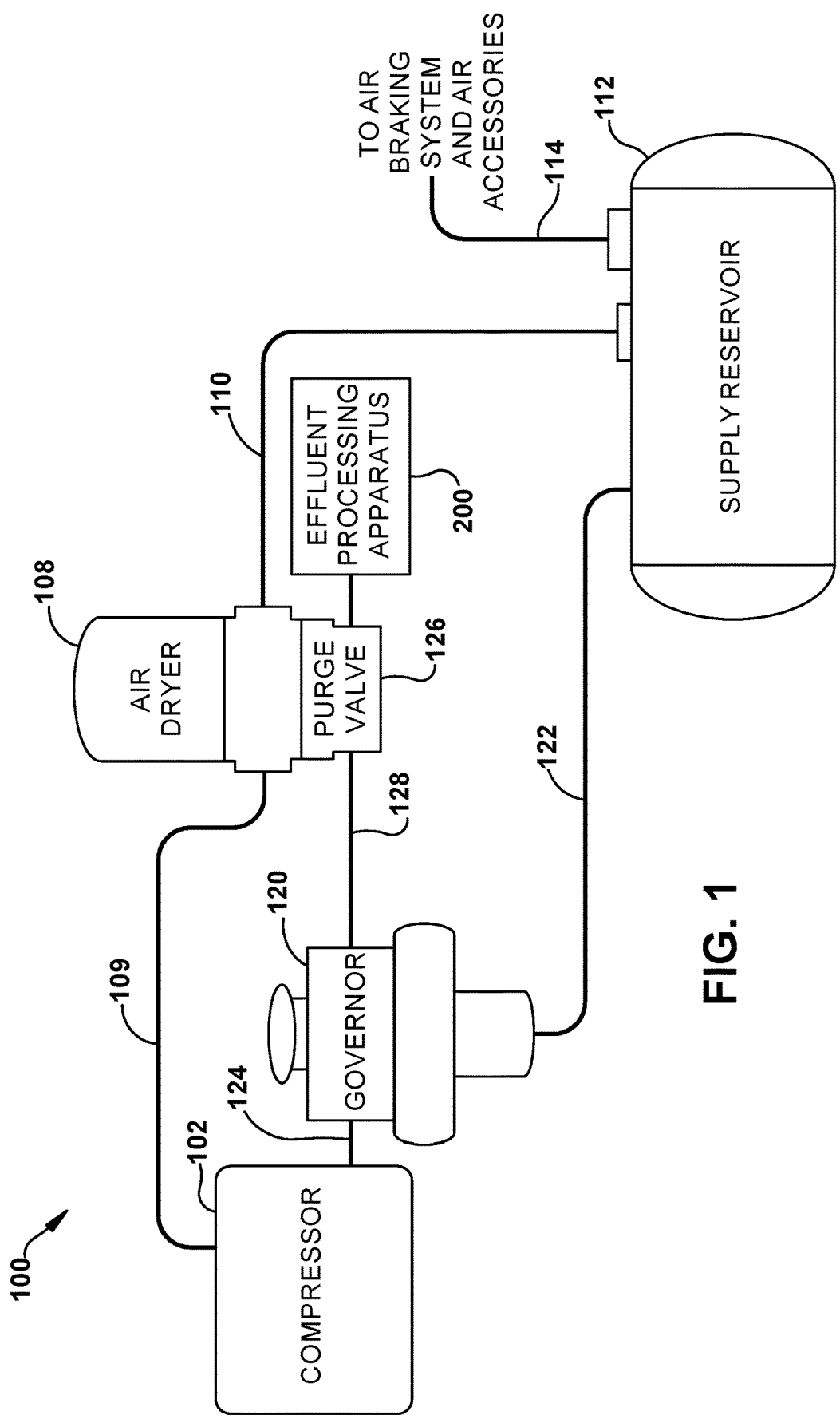
FIG. 1 is a schematic diagram of a vehicle air brake charging system including an example effluent processing apparatus constructed in accordance with an embodiment.

Referring to FIG. 1, a schematic diagram of a vehicle air brake charging system 100 including an example effluent processing apparatus 200 constructed in accordance with an embodiment is illustrated. Vehicle air brake charging system 100 includes an air compressor 102 that generates compressed air in conventional manner. Structure and operation of air compressors are known and, therefore, will not be described.

A first discharge line 109 is pneumatically connected between the compressor 102 and an air dryer 108. A second discharge line 110 is pneumatically connected between the air dryer 108 and a supply reservoir 112. Air supply line 114 is pneumatically connected between the supply reservoir 112 and air braking system and air accessories (not shown) of the vehicle.

A governor 120 controls system air pressure between a preset maximum and minimum pressure level by monitoring the air pressure in pneumatic control line 122 from the supply reservoir 112. When air pressure in the supply reservoir 112 becomes greater than that of a preset "cut-out" setting of the governor 120, the governor controls the compressor 102 on pneumatic control line 124 to stop the compressor from building air. The governor 120 also controls a purge valve 126 on pneumatic control line 128 to purge air from the air dryer 108 in a purge mode. When air pressure in the supply reservoir 112 drops to a preset "cut-in" setting of the governor 120, the governor returns the compressor 102 back to building air and the air dryer 108 to an air drying mode.

Figure 2B:
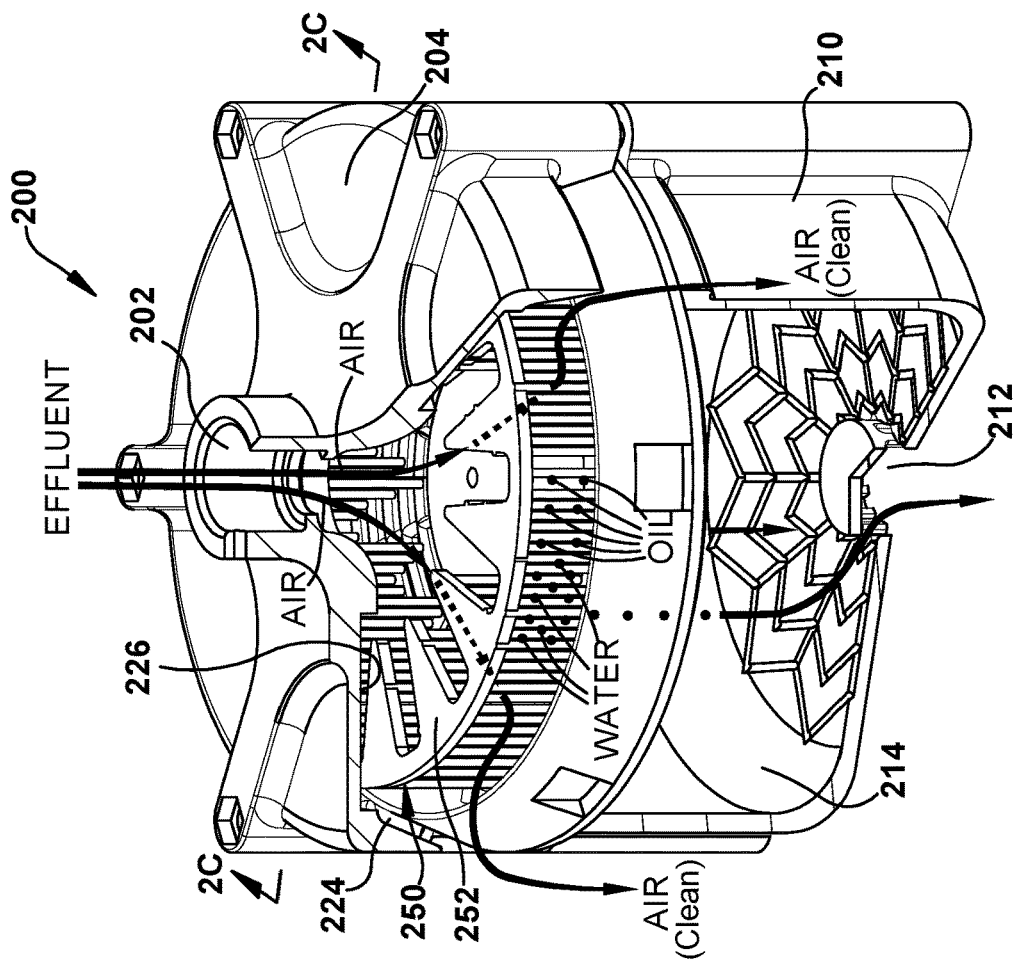
FIG. 2B is a perspective view similar to FIG. 2A with portions removed to show a coalescing element within the effluent processing apparatus.
Figure 2A:
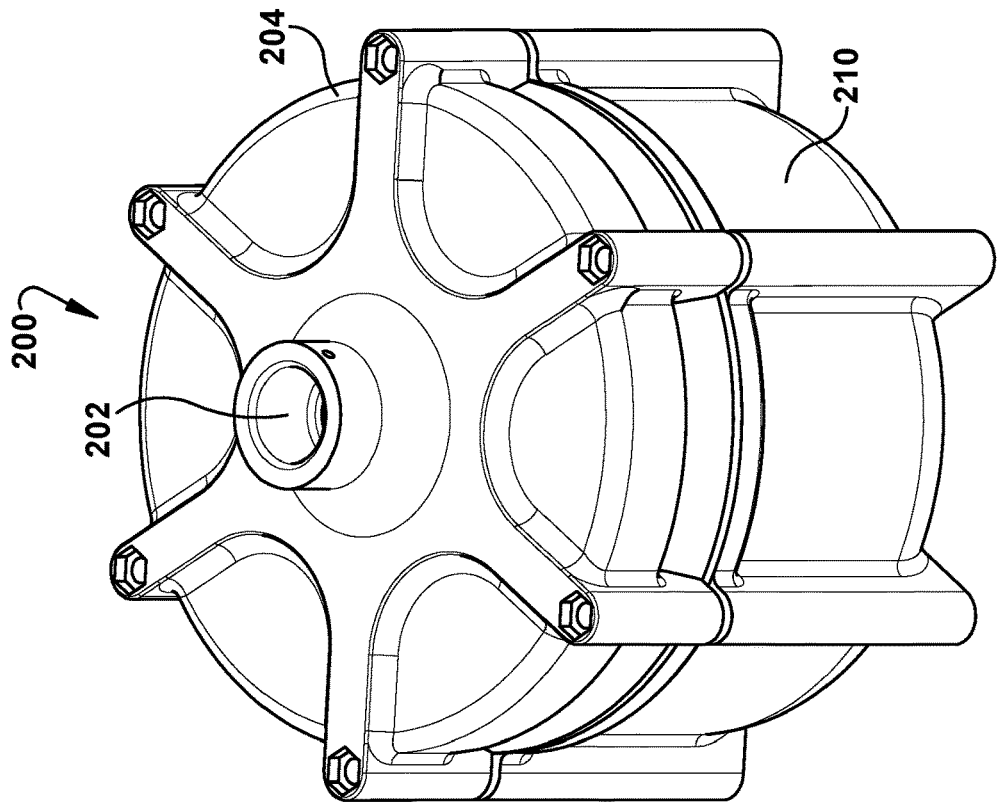
FIG. 2A is a perspective view of the effluent processing apparatus shown in FIG. 1.
Figure 2C:
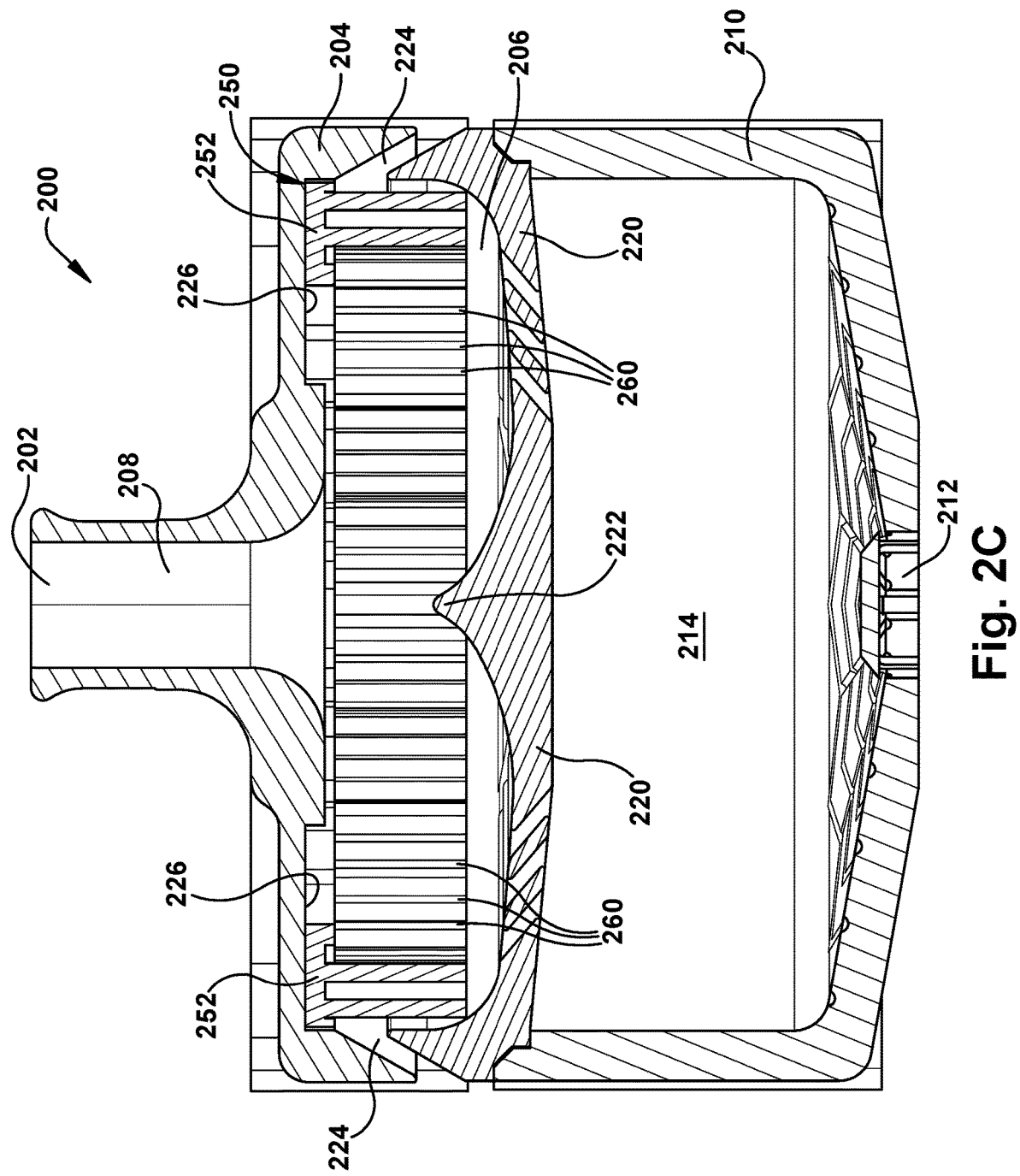
FIG. 2C is a cross-sectional view taken approximately along line 2C-2C shown in FIG. 2B.

Referring to FIG. 2A, a perspective view of the effluent processing apparatus 200 shown in FIG. 1 is illustrated. FIG. 2B is a perspective view similar to FIG. 2A with portions removed to show a coalescing element 250 within the effluent processing apparatus 200. FIG. 2C is a cross-sectional view taken approximately along line 2C-2C shown in FIG. 2B.

As shown in FIGS. 2A, 2B, and 2C, the effluent processing apparatus 200 includes a centrally-disposed inlet port 202 through which effluent containing a mixture of air, oil, and water from the purge valve 126 (FIG. 1) of the air dryer 108 can be received. Alternatively, the effluent may be received from any device that collects air, water, and contaminants.

The effluent processing apparatus 200 includes a top housing portion 204 that defines a substantially cylinder-shaped chamber 206 and an effluent channel 208 along which the effluent flows from the inlet port 202 into a center portion of the chamber 206. The effluent processing apparatus 200 also includes a bottom housing portion 210 that defines an outlet port 212 and a sump 214 into which separated oil and water flows. The sump 214 is removable and replaceable, and contains oil-holding media (not shown) that may include a sponge material, for example, to retain the separated oil. Other oil-holding media can be used.

The effluent processing apparatus 200 may be affixed directly to an air dryer or may be located remotely. The effluent processing apparatus 200 is intended to be mounted vertically (best shown in FIG. 2C) to promote the downward flow of separated oil and water from the effluent channel 208. Example overall physical dimensions of the effluent processing apparatus 200 are about 10 inches (25.4 centimeters) in diameter and about eight inches (20.3 centimeters) in height. A minimum diameter would be about five inches (12.7 centimeters) to provide a sufficient flow path and to avoid back pressure.

The effluent processing apparatus 200 may further include a deflector plate 220 which is supported on the bottom housing portion 210, as best shown in FIG. 2C. The deflector plate 220 has a shape like a disc, and includes a cone-shaped protrusion 222 located at center of the disc. The cone-shaped protrusion 222 points towards the center portion of the chamber 206 and is centrally-aligned with the effluent channel 208. A baffled channel 224 is defined between the top housing portion 204 and the deflector plate 220.

The effluent processing apparatus 200 also includes the coalescing element 250. The coalescing element 250 is located in the chamber 206, and is supported by the top housing 204. More specifically, as best shown in FIG. 2C, the coalescing element 250 is press-fit into a substantially donut-shaped channel 226 in the top housing portion 204.

Figure 2D:
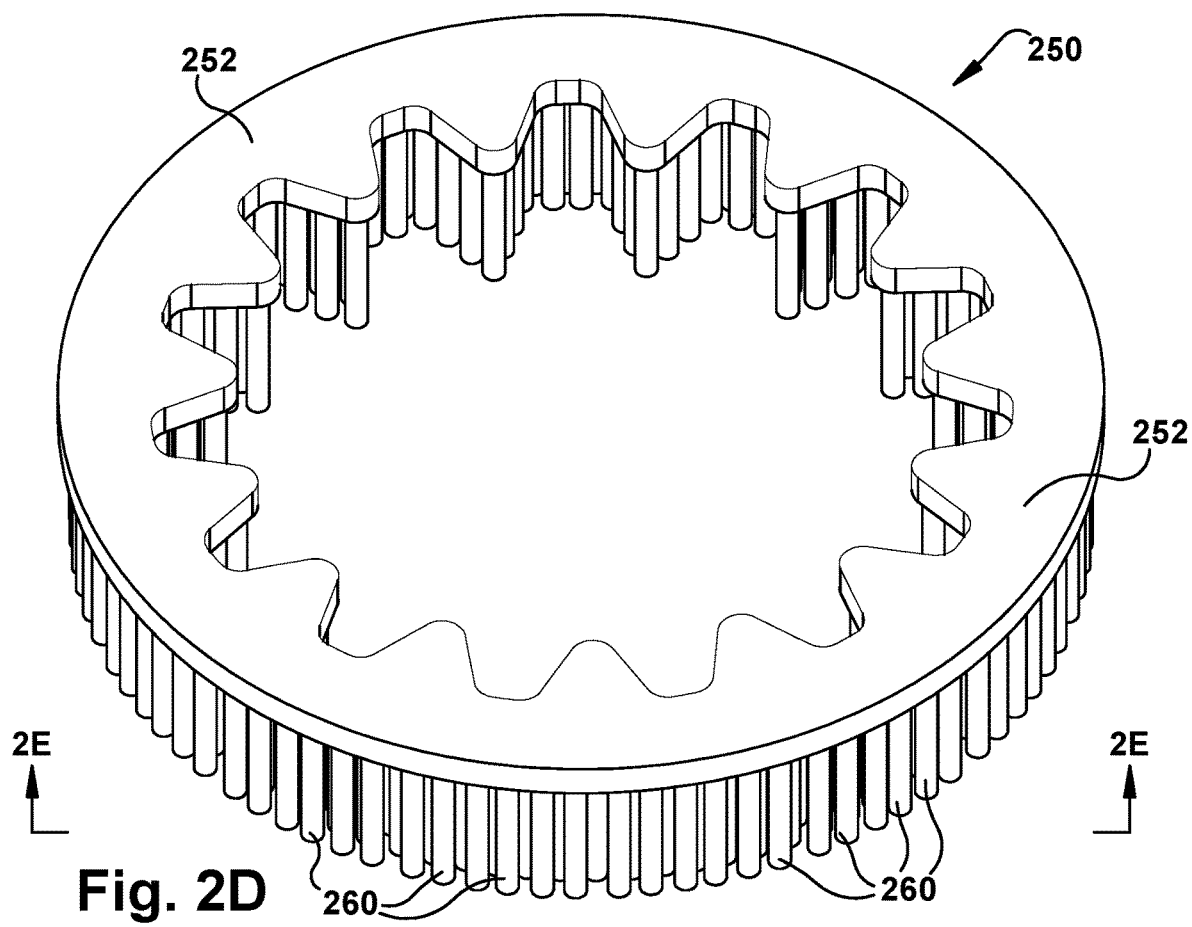
FIG. 2D is an enlarged top perspective view of the coalescing element shown in FIGS. 2B and 2C, and constructed in accordance with an embodiment.
Figure 2E:
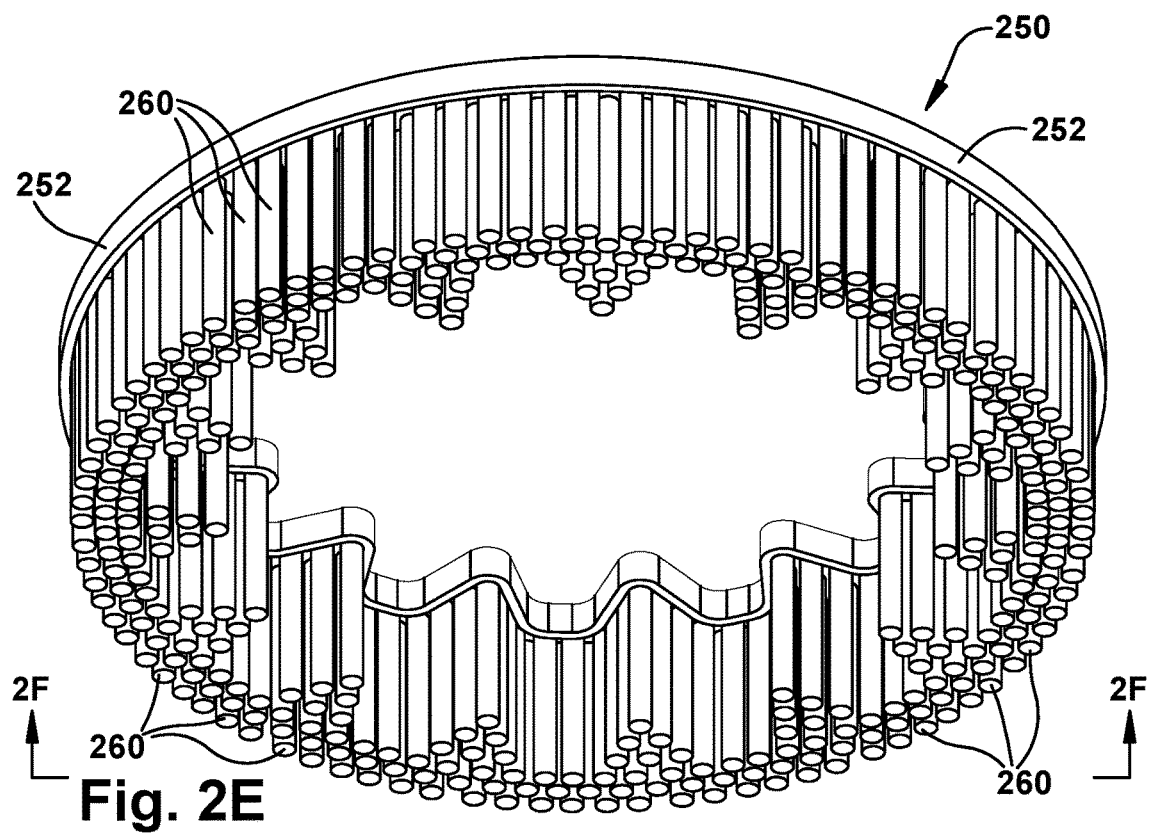
FIG. 2E is a bottom perspective view looking slightly up from the bottom side and in the direction approximately along line 2E-2E shown in FIG. 2D.
Figure 2F:
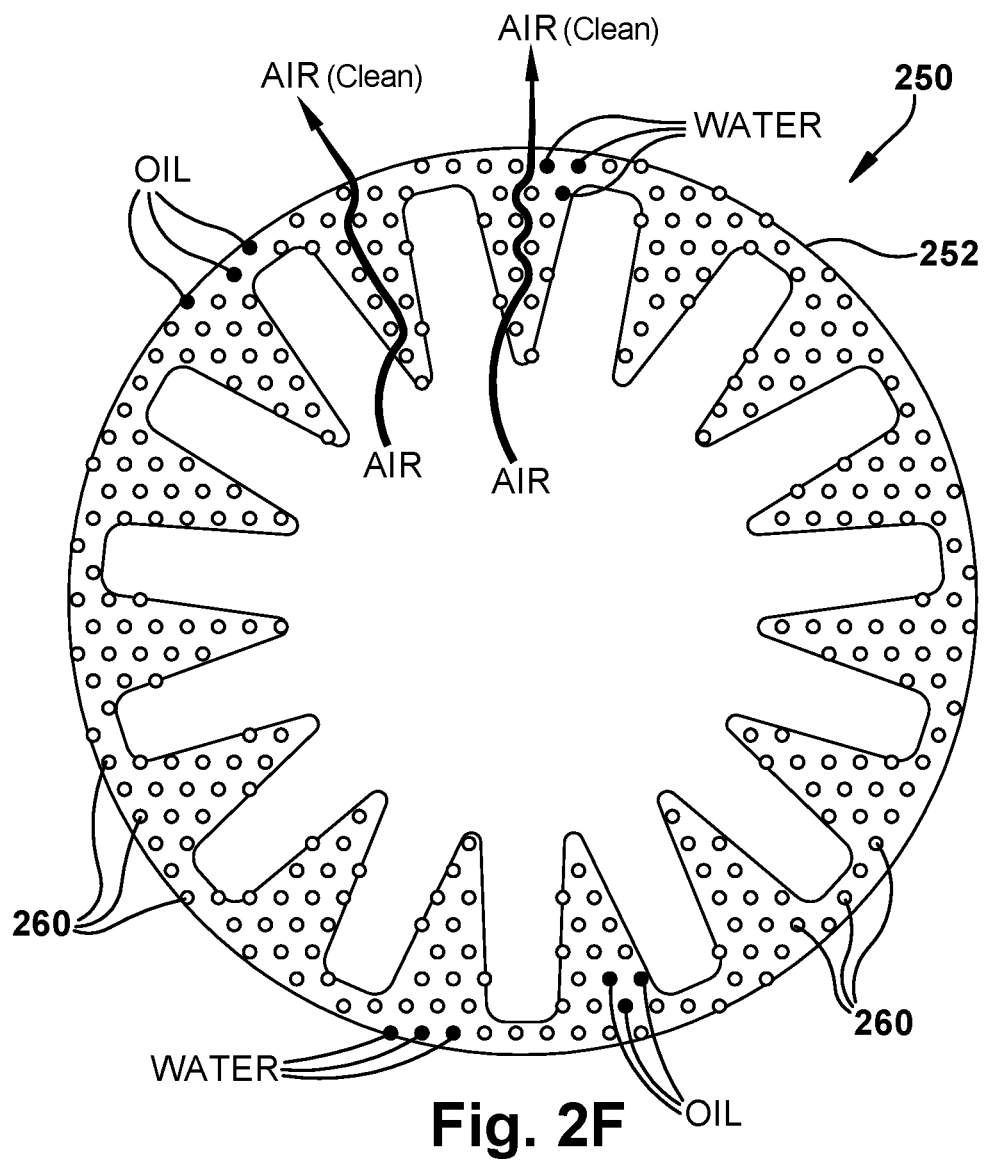
FIG. 2F is a bottom elevational view looking approximately along line 2F-2F shown in FIG. 2E.

Referring to FIG. 2D, an enlarged top perspective view of the coalescing element 250 shown in FIGS. 2B and 2C constructed in accordance with an embodiment is illustrated. FIG. 2E is a bottom perspective view looking slightly up from the bottom side and in the direction approximately along line 2E-2E shown in FIG. 2D. FIG. 2F is a bottom elevational view looking approximately along line 2F-2F shown in FIG. 2E.

The coalescing element 250 includes a ring member 252 that has a general shape of an internal-toothed lock washer. The ring member 252 is press-fit into the substantially donut-shaped channel 226 in the top housing portion 204. The number and width of the tooth patterns can vary with desired design specifications. The ring member 252 should not take up more than 50% of the volume of the chamber 206. The coalescing element 250 is arranged to separate oil and water from the effluent mixture containing air, oil, and water from the purge valve 126 of the air dryer 108 (FIG. 1). In general, the coalescing element 250 includes a plurality of members 260 which define a predefined pattern of paths along which the effluent mixture flows to separate oil and water therefrom.

More specifically, the plurality of members 260 comprise a predefined pattern of bristles which are arranged to provide a predefined pattern of paths along which the effluent mixture flows to separate oil and water therefrom. The bristles 260 comprise a plastic material such as a polyester material having fibers, for example. Each of the bristles 260 is rod-shaped and is inserted into the ring member 252. Thus, each of the bristles 260 is suspended substantially vertically from the ring member 252. The bristles 260 are packed together and arranged in a pattern to form a shape corresponding to the shape of the ring member 252, which is the shape of an internal-toothed lock washer, as best shown in FIG. 2F.

It is conceivable that the profile of the ring member 252 can have any shape, such as the tooth shape disclosed herein. As another example, the profile of the ring member 252 may have a smooth shape. Moreover, it is conceivable that the ring member 252 not be used and eliminated. In this case, the bristles 260 can be inserted into holes that are directly drilled into the top housing portion 204.

When an effluent stream enters the inlet port 202 (designated "EFFLUENT" in FIG. 2B), the stream is directed vertically down through the channel 208 and into the center portion of the chamber 206. The cone-shaped protrusion 222 of the deflector plate 220 then redirects the incoming vertical-flowing stream horizontally outwards toward the bristles 260 of the coalescing element 250. The horizontal-flowing stream moves along the predefined pattern of paths that are defined by the bristles 260. More specifically, the horizontal-flowing stream flows around the bristles 260, as shown by the arrow lines designated "AIR-AIR (Clean)" in FIG. 2F.

As the horizontal-flowing stream flows around the bristles 260, drops of oil and drops of water coalesce onto the material of the bristles 260. As shown in FIG. 2B and FIG. 2F, some of the bristles 260 are shown coalesced with oil (designated "OIL"), and some of the bristles 260 are coalesced with water (designated "WATER"). In actuality, each of the bristles 260 is coalesced with some oil and some water.

The bristles 260 are packed with a density such that the horizontal-flowing stream can flow along the predefined pattern of paths with minimal back pressure as drops of oil and drops of water are coalescing onto the material of the bristles 260. As the material of the bristles 260 saturate with oil and water, the coalesced liquids flow downwards by gravity force through floor openings in the deflector plate 220 into the sump 214. The oil-holding media (not shown) in the sump 214 holds the separated oil until the oil-holding media or the sump 214 or both, are replaced. The separated water exhausts and drains out through the outlet port 212 to return the water to atmosphere.

The bristles 260 may be arranged relative to each other in a number of different geometries to promote secondary flows that would enhance their collection efficiency. For example, the bristles 260 may be arranged relative to each other in a triangular-shaped geometry. As another example, the bristles 260 may be arranged relative to each other in a smooth-shaped geometry. Other geometries for the arrangement of the bristles 260 relative to each other are possible.

After the horizontal-flowing stream flows around the bristles 260, clean air (i.e., the air which is now substantially devoid of oil) exits the coalescing element 250 and flows into an outer perimeter portion of the chamber 206 before flowing into the baffled channel 224 that is defined between the top housing portion 204 and the deflector plate 220. The clean air has water mist, and flows through the baffled channel 224 to atmosphere, as best shown by the arrow lines designated "AIR-AIR (Clean)" in FIG. 2B. The result is cleaner air being expelled to atmosphere, and less oil being deposited and accumulated on roadways.

Referring to FIG. 3A, a perspective view similar to FIG. 2B is shown. In particular, FIG. 3A shows an effluent processing apparatus 300 having a coalescing element 350 constructed in accordance with another embodiment. FIG. 3B is an enlarged top perspective view of the coalescing element 350 shown in FIG. 3A. As shown in FIGS. 3A and 3B, the effluent processing apparatus 300 includes a centrally-disposed inlet port 302 through which effluent containing a mixture of air, oil, and water from the purge valve 126 (FIG. 1) of the air dryer 108 can be received. Alternatively, the effluent may be received from any device that collects air, water, and contaminants.

The effluent processing apparatus 300 includes a top housing portion 304 that defines a substantially cylinder-shaped chamber 306 and an effluent channel 308 along which the effluent flows from the inlet port 302 into the center portion of the chamber 306. The effluent processing apparatus 300 also includes a bottom housing portion 310 that defines an outlet port 312 and a sump 314 into which separated oil and water flows. The sump 314 is removable and replaceable, and contains oil-holding media (not shown) that may include a sponge material, for example, to retain the separated oil. Other oil-holding media can be used.

The effluent processing apparatus 200 may further include a deflector plate 320 which is supported on the bottom housing portion 310. The deflector plate 320 has a shape like a disc, and includes a cone-shaped protrusion 322 located at center of the disc. The cone-shaped protrusion 322 points towards the center portion of the chamber 306 and is centrally-aligned with the effluent channel 308. A baffled channel 324 is defined between the top housing portion 304 and the deflector plate 320.

The coalescing element 350 comprises a predefined pattern of pleats 360 which are arranged to provide a predefined pattern of paths through which the effluent mixture flows to separate oil and water therefrom. More specifically, each of the pleats 360 forms the shape of a ruffled collar, as best shown in FIG. 3B. The pleats 360 have major surfaces 362 along which the effluent mixture flows in parallel to separate oil and water therefrom.

When an effluent stream enters the inlet port 302 (designated "EFFLUENT" in FIG. 3A), the stream is directed vertically down through the channel 308 and into the chamber 306. The cone-shaped protrusion 322 of the deflector 320 redirects the incoming vertical-flowing stream horizontally outwards toward the pleats 360 of the coalescing element 350. The horizontal-flowing stream moves along the predefined pattern of paths that are defined by the major surfaces 362 of the pleats 360.

More specifically, the horizontal-flowing stream flows along the major surfaces 362 of the pleats 360, as shown with the arrow lines marked "AIR-AIR (Clean)" in FIG. 3A. The flow of the stream along the major surfaces 362 results in some turbulence as represented by the small swirling arrows that are adjacent to the large arrow lines marked "AIR-AIR (Clean)". This turbulence facilitates capture of oil and water particles by the major surfaces 362 of the pleats 360.

As the horizontal-flowing stream flows along the major surfaces 362 of the pleats 360, drops of oil and drops of water coalesce onto the major surfaces 362 of the pleats 360. As shown in FIG. 3A, some of the major surfaces 362 are coalesced with oil (designated "OIL"), and some of the major surfaces 362 are coalesced with water (designated "WATER"). In actuality, each of the major surfaces 362 is coalesced with some oil and some water.

The pleats 360 are sufficiently spaced apart from each other such that the effluent stream can flow along the predefined paths with minimal back pressure as drops of oil and drops of water are coalescing onto the major surfaces 362 of the pleats 360. The density of the pleats 360 can be changed by changing the number of folds per degree. There is a tradeoff between particle flow and particle capture when the number of folds per degree is changed. When the density of the pleats 360 is increased, the particle flow is more restricted but the number of particles captured is higher. However, when the density of the pleats 360 is decreased, the particle flow is less restricted but the number of particles captured is lower.

As the major surfaces 362 of the pleats 360 saturate with oil and water, the coalesced liquids flow downwards by gravity force through floor openings in the deflector plate 320 into the sump 314. The oil-holding media (not shown) in the sump 314 holds the separated oil until the oil-holding media or the sump 314 or both, are replaced. The separated water drains out through the outlet port 312.

After the horizontal-flowing stream flows along the major surfaces 362 of the pleats 360, clean air (i.e., the air which is now substantially devoid of oil) exits the coalescing element 350 and flows into an outer perimeter portion of the chamber 306 before flowing into the baffled channel 324 that is defined between the top housing portion 304 and the deflector plate 320. The clean air has water mist, and flows through the baffled channel 324 to atmosphere, as shown by the arrow lines designated "AIR-AIR (Clean)" in FIG. 3A. The result is cleaner air being expelled to atmosphere, and less oil being deposited and accumulated on roadways.

The distance between pleats varies as a function of radius of the coalescing element 350. The peak-to-peak distance at the outer perimeter of the coalescing element 350 is longer than it is toward the center of the coalescing element 350. Accordingly, the particle capture at the wider flow channels at the outer perimeter is poor as compared to the particle capture at the narrower flow channels toward the center of the coalescing element 350.

Figure 3C:
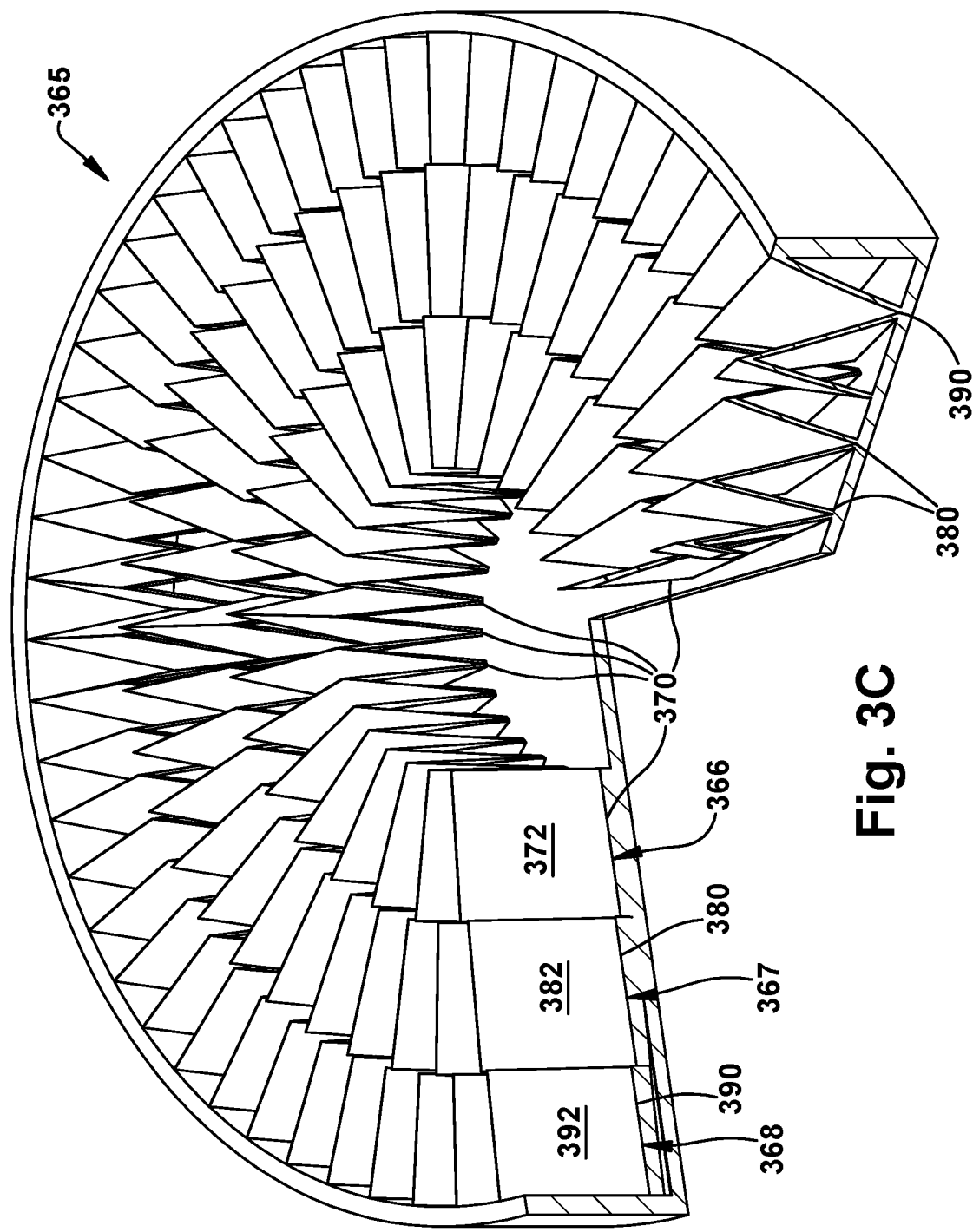
FIG. 3C is an enlarged cutaway perspective showing a coalescing element constructed in accordance with another embodiment.

It is conceivable that a multiple number of ruffled collars be arranged in series to prevent the flow channels from becoming too wide at the outer perimeter of the coalescing element 350. For example, FIG. 3C shows a cutaway perspective view of a coalescing element 365 constructed in accordance with another embodiment. The coalescing element 365 has three ruffled collars, designated with reference numerals 366, 367, 368. The three ruffled collars 366, 367, 368 are nested and concentric. Each successive ruffled collar (from the center to the outer perimeter) has an increased number of pleats per degree to maintain a desired maximum channel width. While three ruffled collars are shown in FIG. 3C, it is conceivable that only two ruffled collars be used, or more than three collars be used.

A first ruffled collar 366 has a first predefined pattern of pleats 370 which are arranged to provide a first portion of a predefined pattern of paths along which the effluent mixture flows to separate oil and water therefrom. Each pleat of the first predefined pattern of pleats 370 forms a portion of the first ruffled collar 366. The first predefined pattern of pleats 370 have major surfaces 372 along which the effluent mixture flows in parallel to separate oil and water therefrom.

A second ruffled collar 367 has a second predefined pattern of pleats 380 which are arranged to provide a second portion of the predefined pattern of paths along which the effluent mixture flows to separate oil and water therefrom. Each pleat of the second predefined pattern of pleats 380 forms a portion of the second ruffled collar 367. The second predefined pattern of pleats 380 have major surfaces 382 along which the effluent mixture flows in parallel to separate oil and water therefrom.

A third ruffled collar 368 has a third predefined pattern of pleats 390 which are arranged to provide a third portion of the predefined pattern of paths along which the effluent mixture flows to separate oil and water therefrom. Each pleat of the third predefined pattern of pleats 390 forms a portion of the third ruffled collar 368. The third predefined pattern of pleats 390 have major surfaces 392 along which the effluent mixture flows in parallel to separate oil and water therefrom.

Referring to FIG. 3D, a perspective view similar to FIG. 3A is shown. In particular, FIG. 3D shows a variation of the coalescing element 350 shown in FIG. 3A. To avoid confusion, the variation of FIG. 3D is described using like numerals in FIG. 3A with the suffix "a" added.

The pleats 360a shown in FIG. 3D are arranged vertically, whereas the pleats 360 shown in FIG. 3A are arranged horizontally. Since the pleats in FIG. 3D are arranged vertically, the effluent (i.e., the mixture of air, oil, and water) flows through the major surfaces 362a of the pleats 360a to separate the oil and the water from the air. In contrast, since the pleats 360 in FIG. 3A are arranged horizontally, the effluent flows along the major surfaces 362 to separate the oil and the water from the air.

Figure 4:
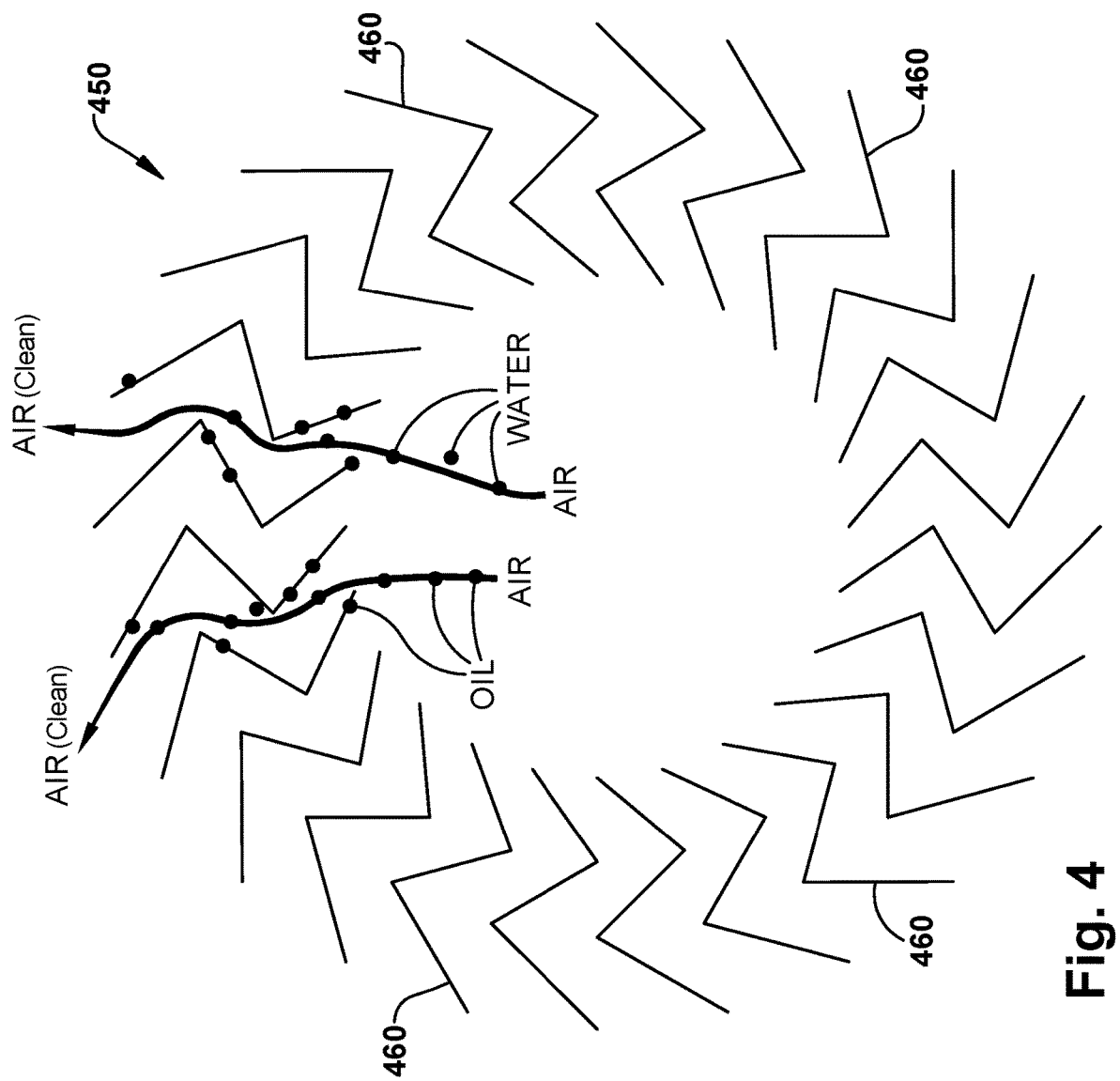
FIG. 4 is a bottom elevational view similar to FIG. 2F, and showing a coalescing element constructed in accordance with another embodiment.

Referring to FIG. 4, a bottom elevational view similar to FIG. 2F is shown. In particular, FIG. 4 shows a coalescing element 450 constructed in accordance with another embodiment. The coalescing element 450 includes a plurality of strips of substantially Z-shaped members 460 which separate oil and water from an effluent mixture as the effluent mixture flows around the plurality of strips of substantially Z-shaped members 460 from the center toward the outer perimeter of the coalescing element 450. The effluent mixture stream flows around the strips of substantially Z-shaped members 460, as shown with the arrow lines marked "AIR-AIR (Clean)" in FIG. 4.

The general flow path is straight. However, the changes in direction imposed by the zigzagging of the strips of Z-shaped members 460 provide convoluted flow paths that increase the likelihood of particles impacting the strips of Z-shaped members 460 to separate out oil and water from the particles. The separated oil is designated "OIL", and the separated water is designated "WATER".

Figure 5:
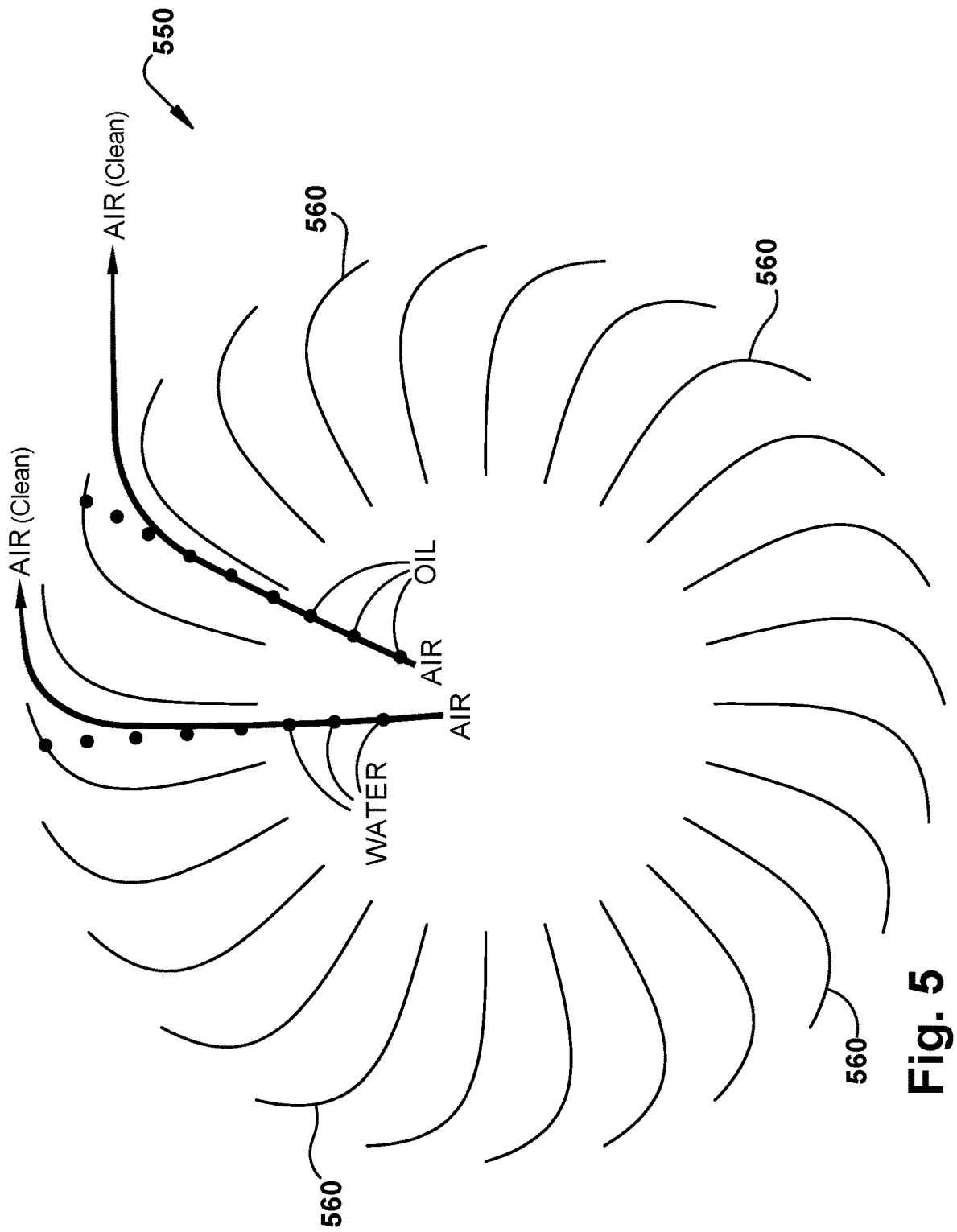
FIG. 5 is a bottom elevational view similar to FIG. 2F, and showing a coalescing element constructed in accordance with another embodiment.

Referring to FIG. 5, a bottom elevational view similar to FIG. 2F is shown. In particular, FIG. 5 shows a coalescing element 550 constructed in accordance with another embodiment. The coalescing element 550 includes a plurality of strips of substantially airfoil-shaped members 560 which separate oil and water from an effluent mixture as the effluent mixture flows around the plurality of strips of substantially airfoil-shaped members from the center toward the outer perimeter of the coalescing element 550. The effluent mixture stream flows around the substantially airfoil-shaped members, as shown with the arrow lines marked "AIR-AIR (Clean)" in FIG. 5.

The general flow path is straight. However, the changes in direction imposed by the curving of the strips of airfoil-shaped members 560 provide curved flow paths that increase the likelihood of particles impacting the strips of airfoil-shaped members 560 to separate out oil and water from the particles. The separated oil is designated "OIL", and the separated water is designated "WATER".

Figure 6:
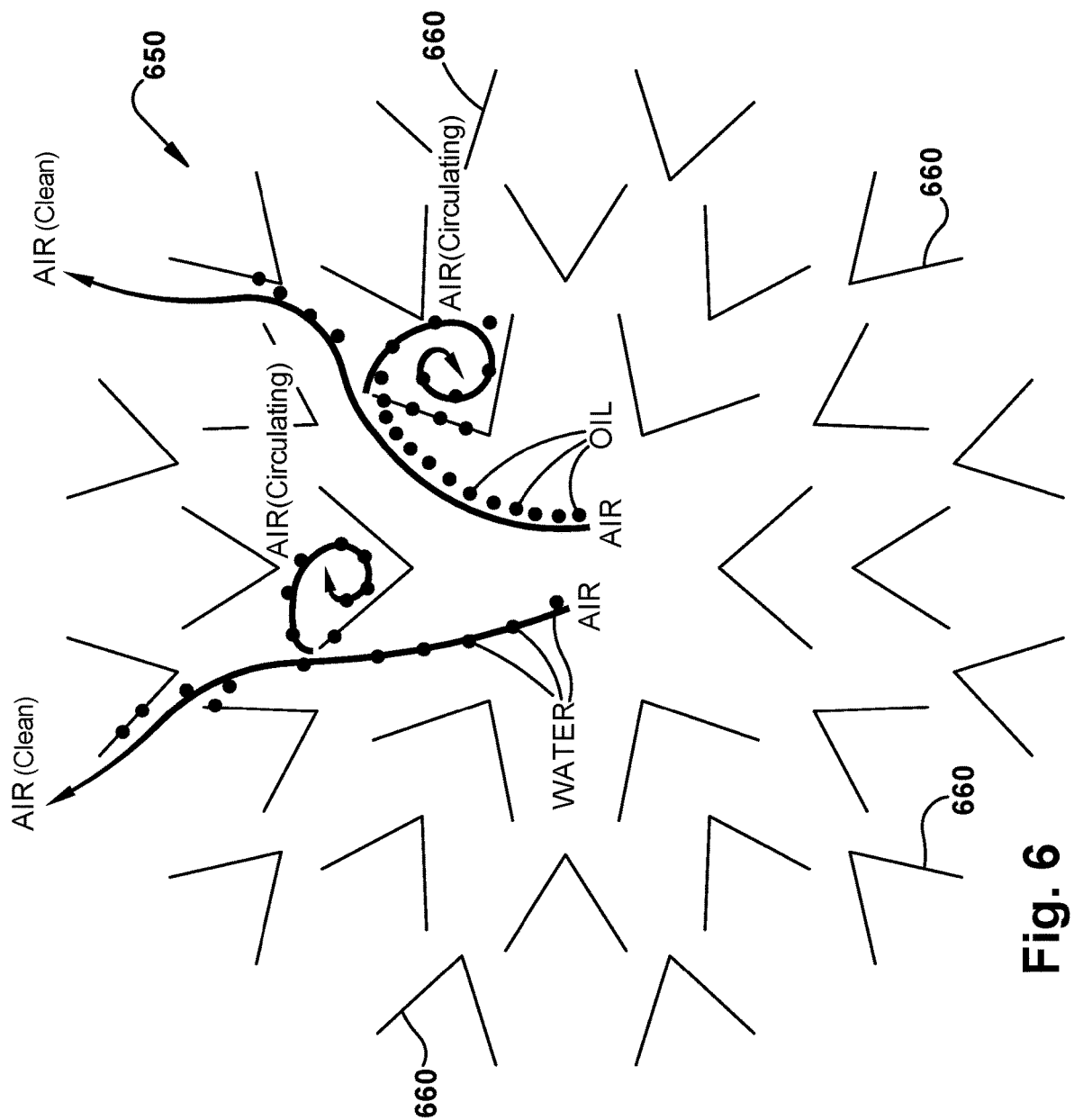
FIG. 6 is a bottom elevational view similar to FIG. 2F, and showing a coalescing element constructed in accordance with another embodiment.

Referring to FIG. 6, a bottom elevational view similar to FIG. 2F is shown. In particular, FIG. 6 shows a coalescing element 650 constructed in accordance with another embodiment. The coalescing element 650 includes a plurality of rows of substantially V-shaped members 660 (i.e., chevrons) which separate oil and water from an effluent mixture as the effluent mixture flows around the plurality of rows of substantially V-shaped members 660.

The V-shaped members 660 are arranged in rows proceeding from the center to the outer perimeter of the coalescing element 650. The rows are staggered (i.e., offset) from each other. Accordingly, each flow path moving towards the outer perimeter is redirected each time it interacts with the point of the next V-shaped member 660. Low pressure zones behind each wing of a V-shaped member 660 induce recirculation.

The effluent mixture stream flows around the substantially V-shaped members 660, as shown with the relatively straight arrow lines marked "AIR-AIR (Clean)". Air circulation is shown with the small swirling arrow lines marked "AIR (Circulating)". The separated oil is designated "OIL", and the separated water is designated "WATER". The flow paths are nonlinear, which increases the likelihood of particle collision. The density of the V-shaped members 660, the gap width, the angle of the V-shape, and the row spacing can be tuned to balance particle collection with back pressure.

Figure 7:
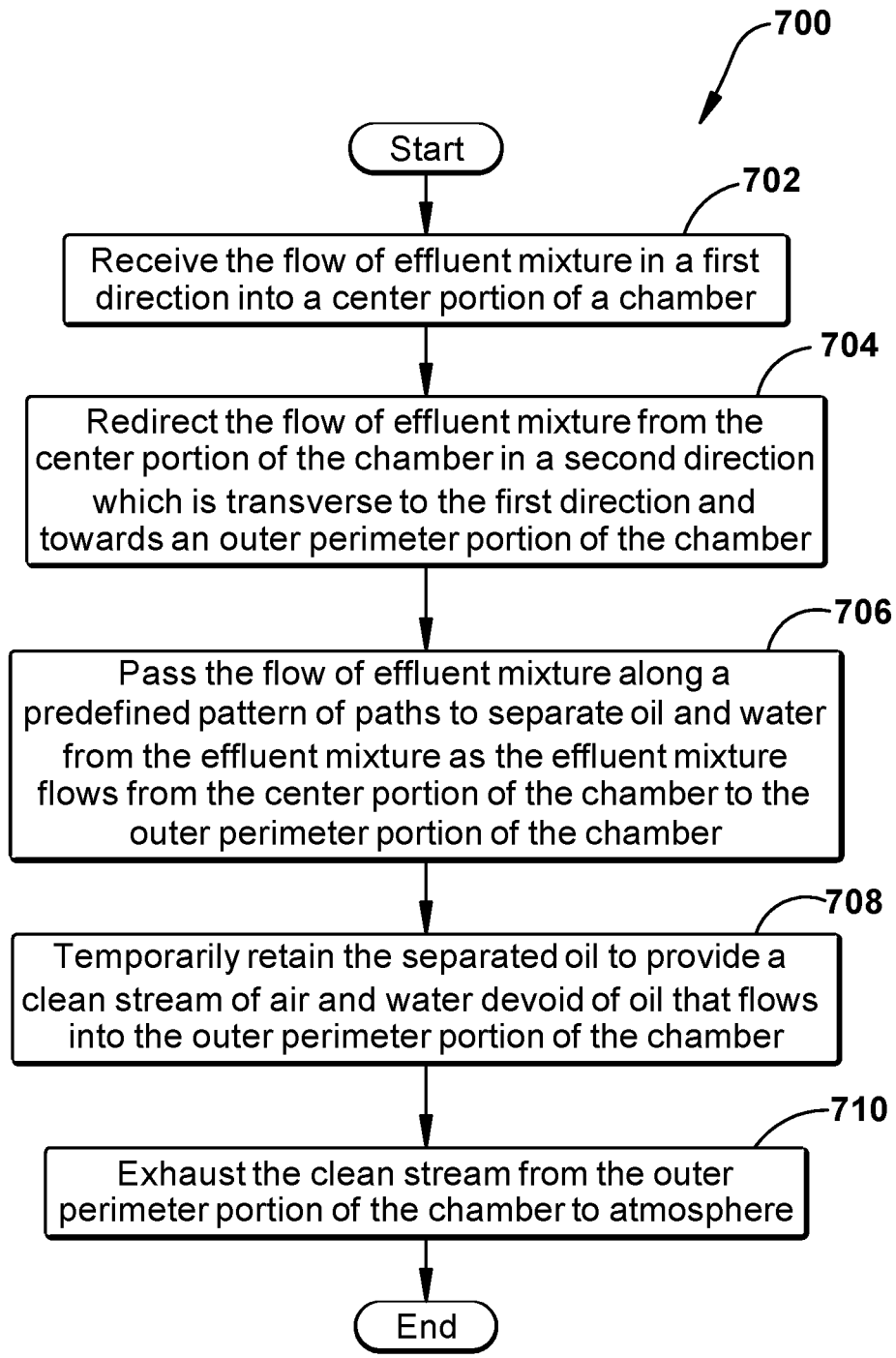
FIG. 7 is a flow diagram depicting a method of operating an effluent processing apparatus in accordance with an embodiment.

Referring to FIG. 7, a flow diagram 700 depicting a method of operating an effluent processing apparatus in accordance with an embodiment is illustrated. In particular, a method is provided of operating an effluent processing apparatus to separate oil and water from an effluent mixture containing air, oil, and water.

In block 702, a flow of effluent mixture in a first direction into a center portion of a chamber is received. Then, in block 704, the flow of effluent mixture is redirected from the center portion of the chamber in a second direction which is transverse to the first direction and towards an outer perimeter portion of the chamber. It is conceivable that the second direction may be other than transverse to the first direction. The flow of effluent mixture passes along a predefined pattern of paths to separate oil and water from the effluent mixture as the effluent mixture flows from the center portion of the chamber to the outer perimeter portion of the chamber, as shown in block 706. The separated oil is temporarily retained, as shown in block 708, to provide a clean stream of air and water devoid of oil that flows into the outer perimeter portion of the chamber. In block 710, the clean stream is exhausted from the outer perimeter portion of the chamber to atmosphere. The process then ends.

In some embodiments, the flow of effluent mixture passes along a predefined pattern of paths formed by bristle-members to separate oil and water from the effluent mixture as the effluent mixture flows from the center portion of the chamber to the outer perimeter portion of the chamber.

In some embodiments, the flow of effluent mixture passes along a predefined pattern of paths formed by major surfaces of a pleated collar to separate oil and water from the effluent mixture as the effluent mixture flows from the center portion of the chamber to the outer perimeter portion of the chamber.

In some embodiments, the flow of effluent mixture passes along a predefined pattern of paths formed by a select one of (i) strips of substantially Z-shaped members, (ii) strips of substantially airfoil-shaped members, and (iii) rows of substantially V-shaped members to separate oil and water from the effluent mixture as the effluent mixture flows from the center portion of the chamber to the outer perimeter portion of the chamber.

In some embodiments, the separated water is exhausted to atmosphere to return the water to atmosphere.

It should be apparent that the above-described coalescing elements are arranged to separate oil and water from the effluent mixture to provide an air stream substantially devoid of oil. The coalescing element is oriented parallel with the flow direction of the effluent mixture such that the effluent mixture flows substantially around or substantially along the coalescing element. The effluent mixture does not flow substantially through the coalescing element.

It should also be apparent that the above-described coalescing elements collect most particulates with a relatively low back pressure. By providing a relatively low back pressure during operation of the vehicle, the performance of the air dryer is minimally impacted.

It should further be apparent that the radial-symmetric design of the above-described coalescing elements allows for easier manufacture. Moreover, the design, as compared to other designs, is easier to package and to install and place in a vehicle.

Although the above-description describes the effluent processing apparatus 200 being used in a heavy vehicle such as a truck, it is conceivable that the effluent processing apparatus 200 may be used in other types of heavy vehicles, such as busses for example.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An effluent processing apparatus comprising:
a housing having an inlet port and a chamber;
a coalescing element located in the chamber and arranged coaxially with the inlet port, the coalescing element having pleats in a predefined pattern of paths arranged to separate oil and water from an effluent mixture containing air, oil, and water, wherein the effluent mixture flows into the inlet port along an axis of the coalescing element and is deflected by a portion of the housing surrounded by the coalescing element to direct flow perpendicular to the axis along major surfaces of the pleats to separate oil and water from the effluent mixture, wherein the portion of the housing deflecting the effluent mixture is a disc-shaped deflector plate having a cone-shaped protrusion located generally central to the axis of the coalescing element.

2. The effluent processing apparatus of claim 1, wherein air substantially devoid of oil exits the coalescing element at an outer perimeter of the chamber and the separated water flows to the bottom of the chamber.

3. The effluence processing apparatus of claim 1, wherein the pleats are arranged vertically with respect to the axis of the coalescing element.

4. The effluent processing apparatus of claim 1, wherein the pleats form the shape of a ruffled collar.

5. The effluent processing apparatus of claim 4, wherein the coalescing element has a first ruffled collar and a second ruffled collar, wherein the effluent mixture flows through a predefined pattern of paths established by the first ruffled collar and the second ruffled collar to separate oil and water from the air.

6. The effluent processing apparatus of claim 5, wherein the first ruffled collar and the second ruffled collar are nested and concentric.

7. The effluent processing apparatus of claim 5, wherein the coalescing element has a third ruffled collar, wherein the effluent mixture flows through a predefined pattern of paths established by the first ruffled collar, the second ruffled collar and the third ruffled collar to separate oil and water from the air.

* * * * *